July 8, 1930.  J. C. MITCHELL  1,770,180
PIPE AND METHOD OF MAKING IT
Filed March 18, 1926
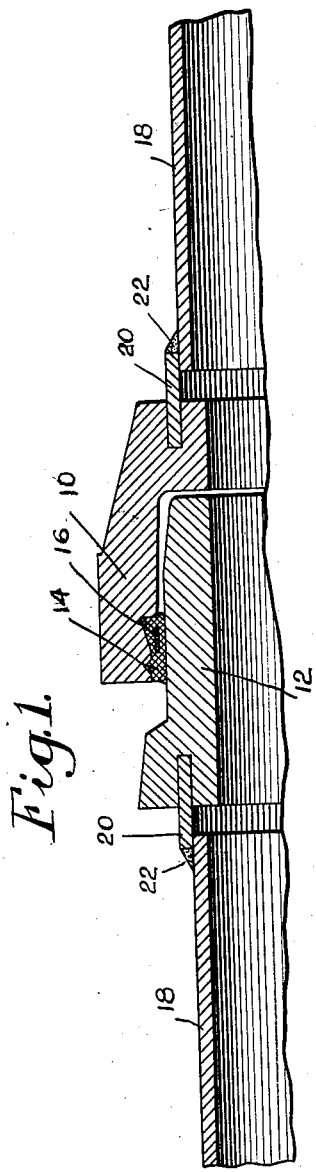
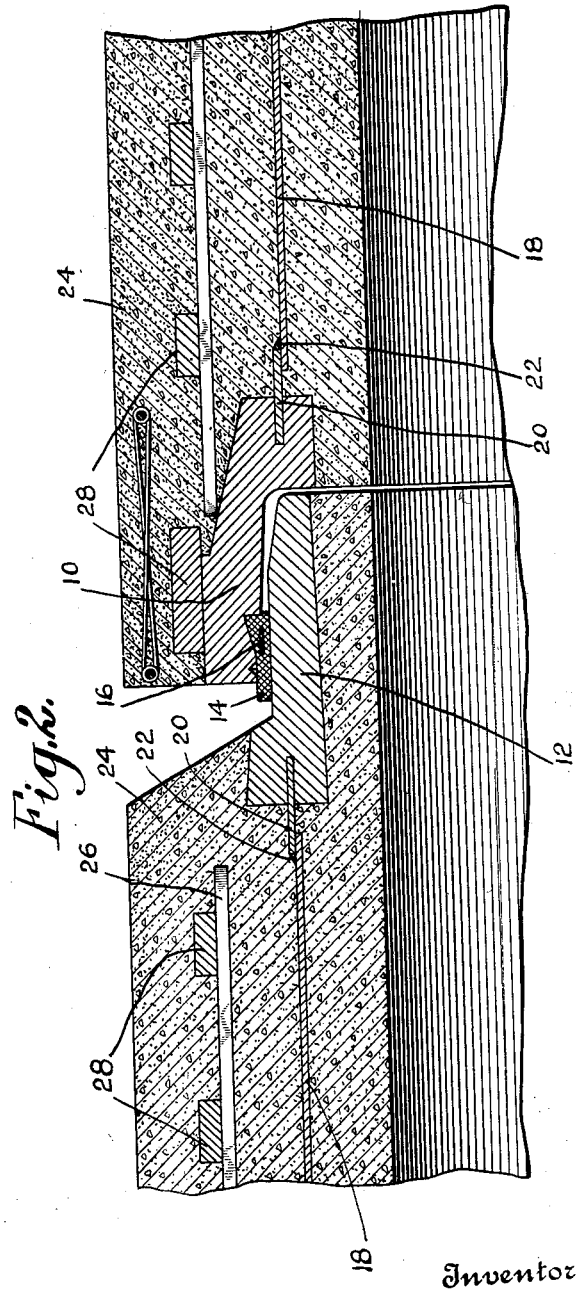
Inventor
John C. Mitchell.
By his Attorneys
Cooper, Kerr & Dunham Patented July 8, 1930

1,770,180

UNITED STATES PATENT OFFICE

JOHN C. MITCHELL, OF BLOOMFIELD, NEW JERSEY, ASSIGNOR TO LOCK JOINT PIPE COMPANY, OF AMPERE, NEW JERSEY, A CORPORATION OF NEW JERSEY

PIPE AND METHOD OF MAKING IT

Application filed March 18, 1926. Serial No. 95,536.

This invention pertains to piping for the handling of water and other liquids. For many purposes it is desirable to use piping made in comparatively short lengths and joined together by means of so-called "self-sealing" joints, which comprise bell and spigot pipe ends with a gasket of lead or lead and fibre to seal the space between the bell and spigot. The joint is formed automatically by forcing the spigot of one length of pipe into the bell of another length, the gasket having previously been placed in position in the bell.

The most convenient and economical metal to use for bell and spigot is generally cast iron, as it can be cast to such shapes as to require the minimum of machine work.

When the pipe line must be of steel, or of concrete formed around steel shells, the problem must be solved of how to design and form self-sealing joints between the lengths of pipe. The cost of forming bell and spigot ends of steel is prohibitive, so efforts have been made to join cast iron bell and spigot ends to steel tubes, in order to combine the advantages of steel for the bodies of the pipes and cast iron for the ends. My present invention is directed to the solution of that problem, which is of special interest and importance in the concrete pipe industry because it is often important to form the concrete around steel shells and join the pipes with self-sealing joints as above described.

Further and other objects and advantages will be hereinafter set forth in the accompanying specification and claims, and shown in the drawings, which by way of illustration show what is now considered to be the preferred embodiment of the invention.

Fig. 1 shows a cross section of a self-sealing joint, joined to a steel pipe.

Fig. 2 shows a cross section of a self-sealing joint in a concrete pipe formed around a steel shell.

The joint is formed by the cast iron bell 10 and spigot 12 with the lead gasket 14 between them. The gasket contains a resilient fibre core 16, but the gasket itself forms no part of the present invention as it is covered in my copending application Serial No. 95,535 filed March 18, 1926.

Each length of steel pipe 18 is fitted on one end with a spigot and on the other end with a bell, the spigot of each length being forced into the bell of the next length through the gasket, which automatically seals the joint. The present invention has to do with the manner of combining bell 10 and spigot 12 to the ends of pipes 18.

20 represents a steel ring of substantially the same material as tube 18, and of such diameter as to slip snugly over the outside of tube 18.

When the mold is prepared for casting bell 10 or spigot 12, a ring 20 is set into the sand of the mold so that a substantial portion of the ring projects into the mold space. When the molten metal is poured into the mold it surrounds ring 20, so when the metal cools the ring 20 is an integral part of the bell or spigot, having been cast tightly into place.

To join the above formed bell or spigot end to the pipe, ring 20 is slipped over the end of pipe 18 and they are welded together as at 22 by any suitable method, such as the electric or oxy-acetylene process, and the pipe is ready for use.

In Fig. 2 is shown a concrete pipe formed on a metallic structure built up as above described. In addition to the parts already mentioned the pipe comprises the concrete body 24 in which are embedded the longitudinal reinforcing bars 26 and the circumferential reinforcing rings 28, all in the well known manner.

It is to be understood that the invention is not limited to the construction herein specifically illustrated but can be embodied in other forms without departing from its spirit.

I claim—

1. The method of forming pipe, comprising casting a ring of cast iron onto a ring of steel, and welding the ring of steel to the end of a steel tube, substantially as described.

2. The method of forming pipe having bell and spigot ends, comprising casting the bell and spigot with steel rings embedded therein and welding the rings to opposite ends of a steel tube, substantially as described.

3. A pipe comprising, in combination, a cast end member cast onto a steel ring set partially into said end member, and a tubular steel body portion, said ring being welded to said body portion.

4. A pipe comprising, in combination, a concrete shell, a steel reinforcing tube, a cast iron end member, and a steel ring cast into said end member, said steel ring being welded to said reinforcing tube, said tube, end member, and steel ring being embedded in said concrete shell, substantially as described.

In testimony whereof I hereto affix my signature.

JOHN C. MITCHELL.